(12) United States Patent
Ohira et al.

(10) Patent No.: US 9,083,046 B2
(45) Date of Patent: *Jul. 14, 2015

(54) CATHODE ACTIVE MATERIAL, CATHODE ELECTRODE AND NON-AQUEOUS SECONDARY BATTERY

(75) Inventors: Koji Ohira, Osaka (JP); Motoaki Nishijima, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 633 days.

This patent is subject to a terminal disclaimer.

(21) Appl. No.: 13/427,416

(22) Filed: Mar. 22, 2012

(65) Prior Publication Data

US 2012/0244443 A1 Sep. 27, 2012

(30) Foreign Application Priority Data

Mar. 23, 2011 (JP) ................................. 2011-064652

(51) Int. Cl.
| | |
|---|---|
| *H01M 4/131* | (2010.01) |
| *H01M 4/58* | (2010.01) |
| *H01M 4/485* | (2010.01) |
| *H01M 4/505* | (2010.01) |
| *H01M 4/525* | (2010.01) |
| *C01B 25/45* | (2006.01) |

(Continued)

(52) U.S. Cl.
CPC ............. *H01M 4/5825* (2013.01); *C01B 25/45* (2013.01); *C01B 31/0423* (2013.01); *H01M 4/485* (2013.01); *H01M 4/505* (2013.01); *H01M 4/525* (2013.01); *H01M 10/052* (2013.01); *Y02E 60/122* (2013.01)

(58) Field of Classification Search
CPC .... H01M 10/052; H01M 4/485; H01M 4/505
USPC .................. 429/221, 231.95, 224, 231.3, 223
See application file for complete search history.

(56) References Cited

U.S. PATENT DOCUMENTS

| | | | |
|---|---|---|---|
| 6,528,033 B1 | 3/2003 | Barker et al. | |
| 6,815,122 B2 * | 11/2004 | Barker et al. | ............. 429/231.9 |
| 2001/0055718 A1 | 12/2001 | Li et al. | |

(Continued)

FOREIGN PATENT DOCUMENTS

| | | |
|---|---|---|
| CA | 2 271 354 A1 | 11/2000 |
| CN | 1837033 A | 9/2006 |

(Continued)

OTHER PUBLICATIONS

English translation of JP 2010-123341, Japan, Jun. 2010, Ohira.*

(Continued)

*Primary Examiner* — Jonathan Jelsma
*Assistant Examiner* — Rashid Alam
(74) *Attorney, Agent, or Firm* — Nixon & Vanderhye P.C.

(57) ABSTRACT

A cathode active material comprising a composition represented by the following general formula (1):

$$Li_aM1_xM2_yM3_zP_mSi_nO_4 \quad (1)$$

wherein M1 is at least one kind of element selected from the group of Mn, Fe, Co and Ni; M2 is any one kind of element selected from the group of Zr, Sn, Y and Al; M3 is at least one kind of element selected from the group of Zr, Sn, Y, Al, Ti, V and Nb and different from M2; "a" satisfies $0<a\le1$; "x" satisfies $0<x\le2$; "y" satisfies $0<y<1$; "z" satisfies $0<z<1$; "m" satisfies $0\le m<1$; and "n" satisfies $0<n\le1$.

9 Claims, 3 Drawing Sheets (51) Int. Cl.
*C01B 31/04* (2006.01)
*H01M 10/052* (2010.01)

(56) References Cited

U.S. PATENT DOCUMENTS

| | | |
|---|---|---|
| 2002/0195591 A1 | 12/2002 | Ravet et al. |
| 2003/0054253 A1 | 3/2003 | Morishima et al. |
| 2003/0170542 A1 | 9/2003 | Barker et al. |
| 2003/0190527 A1 | 10/2003 | Pugh et al. |
| 2003/0215715 A1 | 11/2003 | Barker et al. |
| 2004/0086445 A1 | 5/2004 | Armand et al. |
| 2004/0214084 A1 | 10/2004 | Barker et al. |
| 2005/0058905 A1 | 3/2005 | Barker et al. |
| 2005/0181283 A1 | 8/2005 | Pugh et al. |
| 2006/0014079 A1 | 1/2006 | Chang et al. |
| 2006/0246351 A1 | 11/2006 | Barker et al. |
| 2006/0292444 A1 | 12/2006 | Chiang et al. |
| 2008/0261113 A1 | 10/2008 | Huang et al. |
| 2010/0124703 A1 | 5/2010 | Ohira et al. |
| 2010/0140540 A1 | 6/2010 | Yamada et al. |
| 2012/0070708 A1* | 3/2012 | Ohira et al. .......... 429/94 |
| 2013/0209886 A1* | 8/2013 | Ohira et al. .......... 429/224 |

FOREIGN PATENT DOCUMENTS

| | | |
|---|---|---|
| CN | 101339994 A | 1/2009 |
| DE | 600 13 909 T2 | 9/2005 |
| DE | 600 37 609 T2 | 1/2009 |
| JP | 2001-307726 | 11/2001 |
| JP | 2001-307731 A | 11/2001 |
| JP | 2002-198050 | 7/2002 |
| JP | 2004-178835 | 6/2004 |
| JP | 2005-519451 | 6/2005 |
| JP | 2005-522009 | 7/2005 |
| JP | 2008-506243 | 2/2008 |
| JP | 2009-104794 | 5/2009 |
| JP | 2009-170401 | 7/2009 |
| JP | 2010123341 A * | 6/2010 |
| JP | 2011-077030 | 4/2011 |
| WO | 97/40541 A1 | 10/1997 |
| WO | WO 2008/039170 | 4/2008 |
| WO | 2008/123311 A1 | 10/2008 |
| WO | 2010/134579 A1 | 11/2010 |

OTHER PUBLICATIONS

Office Action mailed Aug. 7, 2014 in U.S. Appl. 13/807,967.
Office Action mailed Mar. 24, 2014 in U.S. Appl. 13/321,717.
Wang et al., Journal of Power Sources 159 (2006), pp. 282-286.
Tian et al., Journal of Rare Earths, vol. 26, No. 2, Apr. 2008, p. 279.
Recham et al., Chem. Mater., 2008, 20, pp. 6798-6809.
Office Action mailed Aug. 8, 2014 in U.S. Appl. 13/321,717.
International Search Report for PCT/JP2011/064694, mailed Sep. 20, 2011.
Office Action mailed Mar. 14, 2014 in U.S. Appl. No. 13/807,967.

* cited by examiner

Fig. 2

Fig. 3 ure, lithium iron phosphate ($LiFePO_4$) having an olivine structure and the like are expected rather than the layered transition metal oxide.

CATHODE ACTIVE MATERIAL, CATHODE ELECTRODE AND NON-AQUEOUS SECONDARY BATTERY

CROSS-REFERENCE TO RELATED APPLICATION

This application is related to Japanese application No. 2011-64652 filed on Mar. 23, 2011, whose priority is claimed under 35 USC 119, the disclosure of which is incorporated by reference in its entirety.

BACKGROUND OF THE INVENTION

1. Field of the Invention

The present invention relates to a cathode active material, a cathode electrode using the cathode active material and a non-aqueous secondary battery (lithium secondary battery) using the cathode electrode. More particularly, the present invention relates to a non-aqueous secondary battery excellent in cycle characteristics and charge/discharge characteristics as well as to a cathode active material and a cathode electrode giving the same.

2. Description of the Related Art

As a secondary battery for a portable electronic apparatus, a lithium secondary battery which is a non-aqueous secondary battery is put into practical use and is widely prevalent. Further, in recent years, a lithium secondary battery is attracting people's attention not only as a small one for a portable electronic apparatus but also as a large-capacity battery for being mounted on a vehicle or for electric power storage. For this reason, there is an increasing demand for safety, cost performance, long lifetime and the like of the lithium secondary battery.

The lithium secondary battery has a cathode electrode, an anode electrode, an electrolytic solution, a separator and an outer cladding material as principal constituent elements. Also, the above cathode electrode is constituted of a cathode active material, an electroconductive material, a current collector and a binder (binding agent).

Generally, as the cathode active material, a layered transition metal oxide represented by $LiCoO_2$ is used. However, the layered transition metal oxide is liable to provoke oxygen elimination in a fully charged state at a comparatively low temperature around 150° C., and this oxygen elimination can provoke thermal bursting reaction of the battery. Therefore, when a battery having such a cathode active material is used in the portable electronic apparatus, there is a fear that heat generation, fire catching and the like of the battery may occur.

For this reason, in view of safety, lithium manganate ($LiMn_2O_4$) having a spinel structure, lithium iron phosphate ($LiFePO_4$) having an olivine structure and the like that are stable in structure and do not release oxygen at an abnormal time are expected.

Also, in view of cost performance, cobalt (Co) has a problem of having a low degree of presence in the earth crust and being expensive.

For this reason, lithium nickelate ($LiNiO_2$), a solid solution thereof ($Li(Co_{1-x}Ni_x)O_2$), lithium manganate ($LiMn_2O_4$), lithium iron phosphate ($LiFePO_4$) and the like are expected.

Also, in view of lifetime, layered transition metal oxides have a problem of causing destruction of the structure of the cathode active material by intercalation and deintercalation of Li to and from the cathode active material accompanying charging/discharging. For this reason, because of being stable in structure, lithium manganate ($LiMn_2O_4$) having a spinel structure, lithium iron phosphate ($LiFePO_4$) having an olivine structure and the like are expected rather than the layered transition metal oxide.

Therefore, as a cathode active material of a battery considering safety, cost performance, lifetime and the like, the above-described lithium iron phosphate having an olivine structure, for example, is attracting people's attention. However, when lithium iron phosphate having an olivine structure is used as a cathode active material in a battery, there will be a problem of lowering of the charge/discharge characteristics such as insufficient electron conductivity and low average electric potential.

For this reason, for the purpose of improving the charge/discharge characteristics, an active material represented by the general formula $A_aM_b(XY_4)_cZ_d$ (wherein A is an alkali metal; M is a transition metal; $XY_4$ is $PO_4$ or the like; and Z is OH or the like) is proposed (for example, see Japanese Patent Unexamined Publication No. 2005-522009: Patent Document 1).

Also, an active material represented by the general formula $LiMP_{1-x}A_xO_4$ (wherein M is a transition metal; A is an element having an oxidation number ≤+4; and 0<x<1) in which a P-site is substituted with the element A is proposed (for example, see Japanese Patent Unexamined Publication No. 2008-506243: Patent Document 2).

Also, as a cathode active material for a non-aqueous secondary battery excellent in charge/discharge characteristics at a large electric current, a material represented by the general formula $Li_{1-x}A_xFe_{1-y-z}M_yMe_zP_{1-m}X_mO_{4-n}Z_n$ (wherein A is Na or K; M is a metal element other than Fe, Li and Al; X is Si, N or As; Z is F, Cl, Br, I, S or N) is proposed (for example, see Japanese Patent Unexamined Publication No. 2002-198050: Patent Document 3).

Also, as an electrode active material being economical and having a good charging capacity and good rechargeability over multiple cycles at the time of production, a material represented by $A_{a+x}M_bP_{1-x}Si_xO_4$ (wherein A is Li, Na or K and M is a metal) is proposed (for example, see Japanese Patent Application Publication No. 2005-519451: Patent Document 4).

Further, lithium transition metal phosphorus such as $LiFePO_4$ in which a difference in molar volume between at least two coexisting phases containing a lithium-rich transition metal phosphate phase and a lithium-poor transition metal phosphate phase is about 5.69 is disclosed (for example, see Table 2 of International Publication No. 2008/039170: Patent Document 5).

SUMMARY OF THE INVENTION

Thus, according to the present invention, there is provided a cathode active material comprising a composition represented by the following general formula (1):

$$Li_aM1_xM2_yM3_zP_mSi_nO_4 \qquad (1)$$

wherein M1 is at least one kind of element selected from the group of Mn, Fe, Co and Ni; M2 is any one kind of element selected from the group of Zr, Sn, Y and Al; M3 is at least one kind of element selected from the group of Zr, Sn, Y, Al, Ti, V and Nb and different from M2; "a" satisfies 0<a≤1; "x" satisfies 0<x≤2; "y" satisfies 0<y<1; "z" satisfies 0<z<1; "m" satisfies 0≤m<1; and "n" satisfies 0<n≤1.

Also, according to the present invention, there is provided a cathode electrode comprising the aforesaid cathode active material, an electroconductive material, and a binder.

Further, according to the present invention, there is provided a non-aqueous secondary battery comprising the aforesaid cathode electrode, a anode electrode, an electrolyte and a separator.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The active materials having the construction described in Patent Documents 1 to 5 do not solve the problem of short lifetime of the obtained battery.

Specifically, with the construction of the active materials described in Patent Documents 1 to 5, expansion or contraction of the cathode active materials caused by intercalation and deintercalation of Li by charging/discharging is large. For this reason, in Patent Documents 1 to 5, when the cycle number increases, there is a fear that the cathode active material may gradually drop off physically from a collector or electroconductive material, thereby destroying the structure of the cathode active material. This is because, with a material exhibiting large expansion or contraction due to charging/discharging, internal resistance of the battery increases due to destruction of secondary particles or destruction of an electroconductive path between the cathode active material and the electroconductive material. As a result thereof, an active material that does not contribute to charging/discharging increases, thereby lowering the capacity and decreasing the lifetime of the battery.

As described above, a cathode active material excellent in all of safety, cost performance and lifetime is demanded. However, with the active materials having the construction described in Patent Documents 1 to 5, an expansion/contraction ratio of volume (volume change ratio) in charging/discharging is high, thereby causing a problem of decrease in the lifetime.

The present invention has been made in view of the aforementioned problems, and an object thereof is to realize a cathode active material capable of providing a battery not only being excellent in safety and cost performance but also having a long lifetime and being excellent in charge/discharge characteristics, a cathode electrode using the cathode active material and a non-aqueous secondary battery using the cathode electrode.

Hereafter, the present invention will be described in more detail. Here, in the present specification, "A to B" representing a range means being larger than or equal to A and smaller than or equal to B. Also, various physical properties mentioned in the present specification mean values measured by methods described in the examples mentioned later unless specifically stated otherwise.

(I) Cathode Active Material

With lithium iron phosphate used as a basic structure, the inventors of the present invention have repeated an operation of element substitution from this structure for a number of times. As a result thereof, the inventors have unexpectedly found out that, by the elements of specific kinds and specific substitution amount, a cathode active material with restrained expansion and contraction can be obtained, thereby completing the present invention.

The cathode active material according to the present invention has a composition represented by the following general formula (1):

$$Li_aM1_xM2_yM3_zP_mSi_nO_4 \quad (1)$$

wherein M1 is at least one kind of element selected from the group of Mn, Fe, Co and Ni; M2 is any one kind of element selected from the group of Zr, Sn, Y and Al; M3 is at least one kind of element selected from the group of Zr, Sn, Y, Al, Ti, V and Nb and different from M2; "a" satisfies $0<a\leq1$; "x" satisfies $0<x\leq2$; "y" satisfies $0<y<1$; "z" satisfies $0<z<1$; "m" satisfies $0\leq m<1$; and "n" satisfies $0<n\leq1$.

Generally, in a case of lithium iron phosphate of olivine type, it contracts in volume when Li is deintercalated from an initial structure by charging. In this structural change, an a-axis and a b-axis contract and a c-axis expands. For this reason, the inventors have conceived that the volume change can be restrained by decreasing the contraction ratio of the a-axis and b-axis and increasing the expansion ratio of the c-axis by some kind of substitution.

Further, the inventors have found out that, by substituting part of a P site with Si and substituting part of an Fe site with other atoms, electric charge compensation within a crystal structure is carried out, and also the volume change occurring at the time of Li deintercalation is restrained and also the expansion/contraction due to charging/discharging is restrained. On the other hand, the inventors have found out that, by substituting the P site with Si, there are cases in which any of the elements of M1, M2 and M3 is present at a Li site.

Here, almost all of materials having the composition of the general formula (1) have an olivine structure. However, the scope of the present invention is not limited to a construction having an olivine structure, so that a construction without having an olivine structure is also comprised within the scope of the present invention.

In the cathode active material according to the present embodiment, the P site is substituted with Si, and the valence numbers of P and Si are different, so that the electric charge compensation within the crystal structure must be carried out. For this reason, the Fe site is substituted with M2 and M3.

The Li site may be occupied by any element of Li, M1, M2 and M3. The P site may be occupied by any element of P, Si and Al. In this case, the content "a" of Li will satisfy $0<a\leq1$. For example, "a" may assume values of 0.1, 0.2, 0.3, 0.4, 0.5, 0.6, 0.7, 0.8, 0.9 and 1. Here, when a<1, loss of the Li site or occupation of the Li site by any element of M1, M2 and M3 is occurring. In case any element of M1, M2 and M3 occupies the Li site, when the content of M1, M2 and M3 occupying the Li site is set to be "b", a relationship of $0<a+b\leq1$ may be allowed to hold. For example, a+b may assume values of 0.1, 0.2, 0.3, 0.4, 0.5, 0.6, 0.7, 0.8, 0.9 and 1.

Also, a approaches 0 by release of Li at the time of discharging and approaches 1 by return of Li at the time of charging. Therefore, the content "b" of M1, M2 and M3 occupying the Li site can be defined by examining the composition of the cathode active material immediately after production or at the time of charging.

Also, the P site may be occupied by any element of P, Si and M3. When the content of M3 occupying the P site is set to be "1", $0<m+n+1<1.5$ may be allowed to hold. For example, $m+n+1$ may assume values of 0.1, 0.3, 0.5, 0.7, 0.9, 1.1 and 1.3. Preferably, $m+n+1$ is within a range of $0.9 \leq m+n+1 \leq 1.1$. Among M3, an element capable of occupying the P site may be, for example, any element of Al, Ti, V and Nb. "m" and "n" preferably satisfy the formula $0<m+n \leq 1.5$.

In particular, when $a+x+y+z+m+n=3$, the structure of the general formula (1) can be an olivine structure similar to that of $LiFePO_4$. At this time, at least a part of the P site may be substituted with Si, and also a part of the Fe site may be substituted with an element capable of performing electric charge compensation within a crystal structure. By this substitution, the volume change occurring at the time of intercalation and deintercalation of Li can be restrained. At this time, there is a possibility that a part of the Li site and the P site may be substituted with any element of M1, M2 and M3. In particular, by substitution of the P site with Si, Fe is more likely to be present in the Li site. When any element of M1, M2 and M3 is present in the Li site, the content is preferably 5% or less, more preferably 3% or less. By the presence of any element of M1, M2 and M3 in the Li site, the volume change occurring at the time of intercalation and deintercalation of Li can be advantageously restrained. Also, a possibility may be considered that Al may enter the P site. When Si or Al is present in the P site, the diffusibility of Li can be advantageously improved.

Also, in the olivine structure having only a one-dimensional diffusion path, when M1, M2 and M3 are present in the Li site, they will be a cause of inhibiting the diffusion of Li, thereby possibly decreasing the charge/discharge characteristics greatly. In this case, the size of the primary particles of the cathode active material is preferably reduced in order to shorten the diffusion path. The size is preferably at least not more than 1 μm. More preferably, the size is 500 nm or less.

Here, for each of M1, M2 and M3, at least one kind of different element must be selected. Also, it is preferable that the content of M1 is the largest. The content of M1 more preferably satisfies at least the formula $x \geq y+z$. Also, for restraining the volume change accompanying the intercalation and deintercalation of Li and improving the charge/discharge characteristics, "x", "y" and "z" preferably satisfy the formula $x>y \geq z$. Also, when the structure of the general formula (1) is an olivine structure, "x", "y" and "z" preferably satisfy the formula $0.9<x+y+z \geq 1.1$. For example, $x+y+z$ may assume values of 0.9, 0.93, 0.95, 0.98, 1, 1.05, 1.08 and 1.1. "x", "y" and "z" preferably satisfy the formula $x+y+z \geq 1$.

Also, the volume change ratio accompanying the intercalation and deintercalation of Li in the general formula (1) is preferably 6% or less. The reason why the volume change ratio is more preferably 6% or less is that, in the cathode active material of the present invention, the volume change ratio of the volume of a unit lattice (volume expansion and contraction ratio by charging/discharging) can be reduced by about 10% from that of conventional $LiFePO_4$. As a result of this reduction, expansion and contraction of the cathode electrode by charging/discharging is restrained, and bonding of between the collectors or electroconductive materials and the active material, and active materials with each other can be maintained, whereby a cathode active material capable of providing a battery having a longer lifetime can be provided. For example, with regard to a long-term lifetime of 1000 cycles or more, a significant difference from that of conventional $LiFePO_4$ can be generated. In other words, reduction of the volume change ratio by about 10% can generate a significant difference in long-term reliability though little difference is generated in short-term reliability.

Also, the cathode active material preferably has a relationship of (discharging capacity of 2 C [mAh/g])/(discharging capacity of 0.1 C [mAh/g]) $\geq 0.9$. Further, as an initial discharging capacity, the capacity is preferably 100 mAh/g or more in the 0.1 C discharging. Here, 1 C refers to an electric current value needed when all of a theoretical capacity of the cathode active material is charged and discharged in one hour.

M1 is preferably any of Mn, Fe, Co and Ni which are 3d transitional metal elements. In particular, Mn and Fe are known to provide an olivine structure and capable of intercalation and deintercalation of Li and therefore are preferable. In particular, Mn can give a high electric potential and therefore is preferable. Also, Fe and Mn may be used by being mixed. The content of M1 preferably satisfies $0<x \leq 2$. When the content of M1 decreases, the capacity of charging/discharging decreases. For example, "x" may assume values of 0.2, 0.4, 0.6, 0.8, 1, 1.2, 1.4, 1.6, 1.8 and 2. A more preferable content "x" of M1 satisfies $0.5 \leq x \leq 2$. Also, in order to provide an olivine structure, the ratio between the Li site, Fe site and P site will be 1:1:1, so that the content of M1 preferably satisfies $0.5 \leq x \leq 1$.

The valence numbers of M2 and M3 are preferably +3 or more. In particular, Zr is preferably contained in M2 or M3. When Zr is contained, the effect of restraining the volume change ratio is great, so that the expansion and contraction of the cathode electrode by charging/discharging can be restrained more, and a cathode active material capable of providing a battery having a longer lifetime can be provided.

M2 is preferably any of Zr, Sn, Y and Al which do not cause valence number change, can be synthesized in a reducing atmosphere and do not have a need for control of oxygen partial pressure for controlling the valence number of substitution elements. By performing substitution of M1 with these elements, the volume change can be restrained, so that the cathode active material preferably contains at least M2. The substitution amount of M2 preferably satisfies $0<y<1$. For example, "y" may assume values of 0.1, 0.2, 0.3, 0.4, 0.5, 0.6, 0.7, 0.8 and 0.9. However, because the charging/discharging capacity decreases in proportion to the substitution amount of these elements, "y" is more preferably within a range of $0<y \leq 0.25$. M2 is preferably Zr or Al in particular, because Zr has a large effect of restraining the volume change and Al has an effect of reducing the contents of M1, M2 and M3 contained in the Li site and has an effect of improving the charge/discharge characteristics.

M3 is preferably at least one kind of metal selected from Zr, Sn, Y, Al, Ti, V and Nb. M3 preferably contains at least one kind of element different from M2. By substituting M1 with an element different from M2, the strain in the structure is alleviated, and the charge/discharge characteristics can be improved. The content of M3 preferably satisfies $0<z<1$. For example, "z" may assume values of 0.1, 0.2, 0.3, 0.4, 0.5, 0.6, 0.7, 0.8 and 0.9. More preferably, z satisfies $0<z \leq 0.25$.

The Zr content in the general formula (1) of the cathode active material is preferably 0.01 to 0.1. When the Zr content is larger than 0.1, an impurity phase is liable to be formed, whereby a single phase may not be stably obtained in some cases. On the other hand, when the Zr content is smaller than 0.01, the effect of restraining the volume change may not be obtained. For example, the Zr content may assume values of 0.01, 0.02, 0.03, 0.04, 0.05, 0.06, 0.07, 0.08, 0.09 and 0.1.

In the cathode active material of the present invention, Al is preferably contained in M2 or M3. More preferably, Zr and Al are contained.

According to the above-described construction, not only excellent charge/discharge characteristics can be obtained while restraining the volume change but also formation of the impurity phase is restrained, whereby the single phase can be stably obtained. As a result, the volume change occurring at the time of intercalation and deintercalation of Li can be restrained, and also the diffusibility of Li ions can be improved. For this reason, when a battery is fabricated using the cathode active material, the expansion and contraction of the cathode electrode caused by charging/discharging can be restrained, and also excellent charge/discharge characteristics can be obtained. Therefore, a cathode active material capable of producing a battery excellent not only in safety and cost performance but also in long lifetime and charge/discharge characteristics can be provided.

The Al content in the general formula (1) of the cathode active material is preferably 0.01 to 0.125. When the Al content is larger than 0.125, the discharging capacity may decrease due to the influence of Al that does not generate valence number change. On the other hand, when the Al content is smaller than 0.01, the effect may not be obtained. For example, the Al content may assume values of 0.01, 0.03, 0.05, 0.07, 0.09, 0.11 and 0.125.

When M2 and M3 are Zr and Al, the content of Zr may be either larger or smaller than the content of Al. When the Zr content is larger, the volume change ratio can be restrained to a greater extent. When the Al content is larger, the charge/discharge characteristics can be improved. In particular, when the content of Zr is equal to the content of Al, excellent characteristics are exhibited. At this time, there is a possibility that Al is contained in a part of the P sites. Because of that, formation of an impurity is restrained, whereby the single phase can be easily obtained. In addition, it seems that activation energy of Li diffusion decreases, and the diffusibility of Li can be improved, whereby the charge/discharge characteristics can be improved.

The cathode active material preferably has a composition represented by the following general formula:

$Li_aFe_xZr_yAl_zP_mSi_nO_4$ wherein "a" satisfies 0<a≤1; "x" satisfies 0<x≤2; "y" satisfies 0<y<1; "z" satisfies 0<z<1; "m" satisfies 0≤m<1; and "n" satisfies 0<n≤1.

A source material of the cathode active material may be any combination of carbonates, hydroxides, chlorides, sulfates, acetates, oxides, oxalates, nitrates and the like of each element. The cathode active material can be produced by subjecting the source material to a method such as the solid phase method, the sol-gel method, the melting-quenching method, the mechanochemical method, the cosedimentation method, the hydrothermal method or the spray pyrolysis method. Also, electric conductivity may be improved by attaching a carbon coating film to the cathode active material, which is generally carried out in lithium iron phosphate of olivine type.

Here, it is convenient that each source material of Li, M1, M2, M3, P and Si is weighed so that x, y, z, m and n will be within the above range when the molar ratio of Li in the Li source material is assumed to be 1.

(II) Cathode Electrode

A cathode electrode contains the above-described cathode active material, an electroconductive material and a binder. Because of containing the above-described cathode active material, this cathode electrode not only is excellent in safety and cost performance but also produces an effect of being capable of providing a cathode electrode that can produce a battery having a long lifetime.

In the cathode electrode, the cathode active material is preferably contained at a ratio of 50 to 99 wt %. Also, the electroconductive material is preferably contained by 1 to 40 parts by weight relative to 100 parts by weight of the cathode active material. Further, the binder is preferably contained by 0.1 to 20 parts by weight relative to 100 parts by weight of the cathode active material.

The cathode electrode can be produced, for example, by a known method such as applying a slurry obtained by mixing the cathode active material, the electroconductive material and the binder with an organic solvent or water to the collector.

As the binder (binding agent), polytetrafluoroethylene, polyvinylidene fluoride, polyvinyl chloride, ethylene propylene diene polymer, styrene-butadiene rubber, acrylonitrile-butadiene rubber, fluorine-containing rubber, polyvinyl acetate, polymethyl methacrylate, polyethylene, nitrocellulose and the like can be used.

As the electroconductive material, acetylene black, carbon, graphite, natural graphite, artificial graphite, needle coke and the like can be used.

As the collector, a foamed (porous) metal having continuous pores, metal formed into a honeycomb shape, a sintered metal, an expanded metal, a non-woven cloth, a plate, a foil, a perforated plate, a foil and the like can be used.

As the organic solvent, N-methylpyrrolidone, toluene, cyclohexane, dimethylformamide, dimethylacetamide, methyl ethyl ketone, methyl acetate, methyl acrylate, diethyltriamine, N,N-dimethylaminopropylamine, ethylene oxide, tetrahydrofuran and the like can be used.

The thickness of the cathode electrode is preferably about 0.01 to 20 mm. When the thickness is too large, the electric conductivity may decrease. When the thickness is too small, the capacity per unit area may decrease. Here, the cathode electrode obtained by application and drying may be compressed with use of a roller press or the like in order to enhance the packing density of the active material.

(III) Non-Aqueous Secondary Battery

A non-aqueous secondary battery has the cathode electrode, a anode electrode, an electrolyte and a separator. Because of having the above-described cathode electrode, this non-aqueous secondary battery not only is excellent in safety and cost performance but also produces an effect of being capable of providing a battery having a long lifetime. Hereafter, each constituent material will be described.

(a) Cathode Electrode

As the cathode electrode, the one mentioned in the above section (II) is used.

(b) Anode Electrode

The anode electrode can be fabricated by a known method. Specifically, the anode electrode can be fabricated by a method similar to the one described in the method for fabricating the cathode electrode. Namely, after a known binder and a known electroconductive material are mixed with a anode active material, this mixture powder is molded into a sheet form. An obtained molded body is press-bonded onto an electroconductive net (collector) made of stainless steel, copper or the like, whereby the anode electrode can be fabricated. Also, the anode electrode can be fabricated by applying a slurry obtained by mixing the aforementioned mixture powder with a known organic solvent described in the method for fabricating the cathode electrode or water, onto a metal substrate such as copper.

As the anode active material, a known material can be used. Among these, in order to construct a high-energy-density battery, those in which an electric potential at which lithium is intercalated/deintercalated is close to a deposition/dissolution electric potential of metal lithium are preferable. A typical example thereof is a carbon material such as natural or artificial graphite having a particulate form (scale form, bulk form, fiber form, whisker form, spherical form, ground particulate form, or the like).

Examples of the artificial graphite include a graphite obtained by graphitization of mesocarbon microbeads, mesophase pitch powder, isotropic pitch powder or the like. Also, graphite particles in which amorphous carbon is allowed to adhere to a surface thereof can be used. Among these, natural graphite is more preferable because it is inexpensive and has an electric potential close to an oxidation reduction electric potential of lithium, so that a high-energy-density battery can be constructed.

Also, a known anode active material such as lithium transition metal oxide, lithium transition metal nitride, a transition metal oxide or silicon oxide can be used. Among these, $Li_4Ti_5O_{12}$ is more preferable because flatness of the electric potential is high and also the volume change by charging/discharging is small.

(c) Electrolyte

As the electrolyte, for example, an organic electrolytic solution, a gel-form electrolyte, a polymer solid electrolyte, an inorganic solid electrolyte, a molten salt and the like can be used. After injecting the electrolyte, an opening part of the battery is sealed. Before sealing, energization may be carried out and a produced gas may be removed.

Examples of the organic solvent constituting the organic electrolytic solution include cyclic carbonates such as propylene carbonate (PC), ethylene carbonate (EC) and butylene carbonate; chain carbonates such as dimethyl carbonate (DMC), diethyl carbonate (DEC), ethyl methyl carbonate and dipropyl carbonate; lactones such as γ-butyrolactone (GBL) and γ-valerolactone; furans such as tetrahydrofuran and 2-methyltetrahydrofuran; ethers such as diethyl ether, 1,2-dimethoxyethane, 1,2-diethoxyethane, ethoxymethoxyethane and dioxane; dimethyl sulfoxide; sulfolane; methylsulfolane; acetonitrile; methyl formate; methyl acetate and the like. These may be used as a mixture of one or more kinds.

Also, cyclic carbonates such as PC, EC and butylene carbonate are suitable as a solvent to be mixed with GBL because of having a high boiling point.

Examples of an electrolyte salt constituting the organic electrolytic solution include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$) and lithium bis(trifluoromethanesulfone)imide ($LiN(CF_3SO_2)_2$). These can be used as a mixture of one or more kinds. The electrolyte salt concentration of the electrolytic solution is suitably 0.5 to 3 mol/l.

(d) Separator

The separator may be, for example, a porous material, a non-woven cloth, or the like. As a material of the separator, those that do not become dissolved or swollen by the above-described organic solvent contained in the electrolyte are preferable. Specific examples thereof include polyester polymers, polyolefin polymers (for example, polyethylene, polypropylene), ether polymers, and inorganic materials such as glass.

(e) Here, in the non-aqueous secondary battery of the present invention, various materials used in a conventionally known non-aqueous secondary battery can be used for a battery case, other structural materials and the like without any particular limitation.

(f) Method of Producing a Non-Aqueous Secondary Battery

The non-aqueous secondary battery can be fabricated, for example, by laminating the cathode electrode and the anode electrode with a separator interposed therebetween. The laminated electrodes may have, for example, a stripe-like planar shape. Also, in a case of fabricating a tubular or flat battery, the laminated electrodes may be rounded and wound.

One or a plurality of the laminated electrodes can be inserted into a battery container. Typically, the cathode electrode and the anode electrode are connected to an external electroconductive terminal of the battery. Thereafter, the battery container may be sealed so as to shield the electrodes and the separator against ambient air.

A method of sealing in the case of a tubular battery is typically a method of fitting a lid having a packing made of resin into an opening of the battery container and caulking the container. Also, in the case of a prismatic battery, a method of attaching a metallic lid called a sealed opening plate to an opening part and performing welding can be used. Besides these methods, a method of sealing with use of a binding agent and a method of fixing with a screw through the intermediary of a gasket can be used. Further, a method of sealing with a laminate film in which a thermoplastic resin is bonded to a metal foil can be used. Here, an opening part for injecting the electrolyte may be provided at the time of sealing.

EXAMPLES

Hereafter, the present invention will be described in more detail on the basis of Examples; however, the present invention is not limited to the following Examples. Here, for the chemical reagents used in the Examples, analytical grade reagents manufactured by Kishida Chemical Co., Ltd. were used unless specified otherwise.

Example 1

As starting source materials, $LiCH_3COO$ as a lithium source, $Fe(NO_3)_3 \cdot 9H_2O$ as an iron source, $ZrCl_4$ as a zirconium source, $AlCl_3$ as an aluminum source, $H_3PO_4$ as a phosphorus source and $Si(OC_2H_5)_4$ as a silicon source were used. By setting the weight of $LiCH_3COO$ serving as the lithium source to be 1.3196 g, the above materials were weighed so that the molar ratio thereof would be Li:Fe:Zr:Al:P:Si=1: 0.95:0.025:0.025:0.925:0.075. First, the Fe source was dissolved in 30 ml of ethanol, and subsequently the Li source, Si source, Zr source and Al source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of $LiFe_{0.95}Zr_{0.025}Al_{0.025}P_{0.925}Si_{0.075}O_4$ which is a cathode active material of olivine type. The obtained sample will be referred to as A1.

Example 2

As starting source materials, $LiCH_3COO$ as a lithium source, $Fe(NO_3)_3 \cdot 9H_2O$ as an iron source, $ZrCl_4$ as a zirconium source, $AlCl_3$ as an aluminum source, $H_3PO_4$ as a phosphorus source and $Si(OC_2H_5)_4$ as a silicon source were used.

By setting the weight of LiCH$_3$COO serving as the lithium source to be 1.3196 g, the above materials were weighed so that the molar ratio thereof would be Li:Fe:Zr:Al:P:Si=1:0.9: 0.05:0.05:0.85:0.15. First, the Fe source was dissolved in 30 ml of ethanol, and subsequently the Li source, Si source, Zr source and Al source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.9}$Zr$_{0.05}$Al$_{0.05}$P$_{0.85}$Si$_{0.15}$O$_4$ which is a cathode active material of olivine type. The obtained sample will be referred to as A2.

Example 3

As starting source materials, LiCH$_3$COO as a lithium source, Fe(NO$_3$)$_3$.9H$_2$O as an iron source, ZrCl$_4$ as a zirconium source, AlCl$_3$ as an aluminum source, H$_3$PO$_4$ as a phosphorus source and Si(OC$_2$H$_5$)$_4$ as a silicon source were used. By setting the weight of LiCH$_3$COO serving as the lithium source to be 1.3196 g, the above materials were weighed so that the molar ratio thereof would be Li:Fe:Zr:Al:P:Si=1:0.9: 0.025:0.075:0.875:0.125. First, the Fe source was dissolved in 30 ml of ethanol, and subsequently the Li source, Si source, Zr source and Al source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.9}$Zr$_{0.025}$Al$_{0.075}$P$_{0.875}$Si$_{0.125}$O$_4$ which is a cathode active material of olivine type. The obtained sample will be referred to as A3.

Example 4

As starting source materials, LiCH$_3$COO as a lithium source, Fe(NO$_3$)$_3$.9H$_2$O as an iron source, ZrCl$_4$ as a zirconium source, AlCl$_3$ as an aluminum source, H$_3$PO$_4$ as a phosphorus source and Si(OC$_2$H$_5$)$_4$ as a silicon source were used. By setting the weight of LiCH$_3$COO serving as the lithium source to be 1.3196 g, the above materials were weighed so that the molar ratio thereof would be Li:Fe:Zr:Al:P:Si=1: 0.875:0.0625:0.0625:0.8125:0.1875. First, the Fe source was dissolved in 30 ml of ethanol, and subsequently the Li source, Si source, Zr source and Al source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.875}$Zr$_{0.0625}$Al$_{0.625}$P$_{0.8125}$Si$_{0.1875}$O$_4$ which is a cathode active material of olivine type. The obtained sample will be referred to as A4.

Example 5

As starting source materials, LiCH$_3$COO as a lithium source, Fe(NO$_3$)$_3$.9H$_2$O as an iron source, ZrCl$_4$ as a zirconium source, AlCl$_3$ as an aluminum source, H$_3$PO$_4$ as a phosphorus source and Si(OC$_2$H$_5$)$_4$ as a silicon source were used. By setting the weight of LiCH$_3$COO serving as the lithium source to be 1.3196 g, the above materials were weighed so that the molar ratio thereof would be Li:Fe:Zr:Al:P:Si=1: 0.875:0.025:0.1:0.85:0.15. First, the Fe source was dissolved in 30 ml of ethanol, and subsequently the Li source, Si source, Zr source and Al source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.875}$Zr$_{0.025}$Al$_{0.1}$P$_{0.85}$Si$_{0.15}$O$_4$ which is a cathode active material of olivine type. The obtained sample will be referred to as A5.

Comparative Example 1

As starting source materials, LiCH$_3$COO as a lithium source, Fe(NO$_3$)$_3$.9H$_2$O as an iron source, AlCl$_3$ as an aluminum source, H$_3$PO$_4$ as a phosphorus source and Si(OC$_2$H$_5$)$_4$ as a silicon source were used. By setting the weight of LiCH$_3$COO serving as the lithium source to be 1.3196 g, the above materials were weighed so that the molar ratio thereof would be Li:Fe:Al:P:Si=1:0.95:0.05:0.95:0.05. First, the Fe source was dissolved in 30 ml of ethanol, and subsequently the Li source, Si source and Al source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.95}$Al$_{0.05}$P$_{0.95}$Si$_{0.05}$O$_4$ which is a cathode active material of olivine type. The obtained sample will be referred to as B1.

Comparative Example 2

As starting source materials, LiCH$_3$COO as a lithium source, Fe(NO$_3$)$_3$.9H$_2$O as an iron source, AlCl$_3$ as an aluminum source, H$_3$PO$_4$ as a phosphorus source and Si(OC$_2$H$_5$)$_4$ as a silicon source were used. By setting the weight of LiCH$_3$COO serving as the lithium source to be 1.3196 g, the above materials were weighed so that the molar ratio thereof would be Li:Fe:Al:P:Si=1:0.875:0.125:0.875:0.125. First, the Fe source was dissolved in 30 ml of ethanol, and subsequently the Li source, Si source and Al source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.875}$Al$_{0.125}$P$_{0.875}$Si$_{0.125}$O$_4$ which is a cathode active material of olivine type. The obtained sample will be referred to as B2.

Comparative Example 3

As starting source materials, LiCH$_3$COO as a lithium source, Fe(NO$_3$)$_3$9H$_2$O as an iron source, ZrCl$_4$ as a zirconium source, H$_3$PO$_4$ as a phosphorus source and Si(OC$_2$H$_5$)$_4$ as a silicon source were used. By setting the weight of LiCH$_3$COO serving as the lithium source to be 1.3196 g, the above materials were weighed so that the molar ratio thereof would be Li:Fe:Zr:P:Si=1:0.9:0.1:0.8:0.2. First, the Fe source was dissolved in 30 ml of ethanol, and subsequently the Li source, Si source and Zr source were dissolved in this order. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFe$_{0.9}$Zr$_{0.1}$P$_{0.5}$Si$_{0.2}$O$_4$ which is a cathode active material of olivine type. The obtained sample will be referred to as B3.

Comparative Example 4

As starting source materials, LiCH$_3$COO as a lithium source, Fe(NO$_3$)$_3$.9H$_2$O as an iron source and H$_3$PO$_4$ as a phosphorus source were used. By setting the weight of LiCH$_3$COO serving as the lithium source to be 1.3196 g, the above materials were weighed so that the molar ratio thereof would be Li:Fe:P=1:1:1. First, the Fe source was dissolved in 30 ml of ethanol, and subsequently the Li source was dissolved. Finally, the P source which had been diluted with ethanol was mixed with the ethanol in which the other elements had been dissolved. After stirring at room temperature for one hour with a stirrer, the mixture was gelled with a drier of 60° C., followed by drying to obtain a precursor.

To the obtained precursor, 15 wt % of sucrose was added, and the mixture was fired at 600° C. in a nitrogen atmosphere for 12 hours to synthesize a single phase powder of LiFePO$_4$ which is a cathode active material of olivine type. The obtained sample will be referred to as B4.

(Evaluation of Cathode Active Material)

With respect to the cathode active materials of A1 to A5 and B1 to B4 obtained in the above Examples and Comparative Examples, the following measurement was carried out.

<Structural Analysis of Powder>

Figure 1:
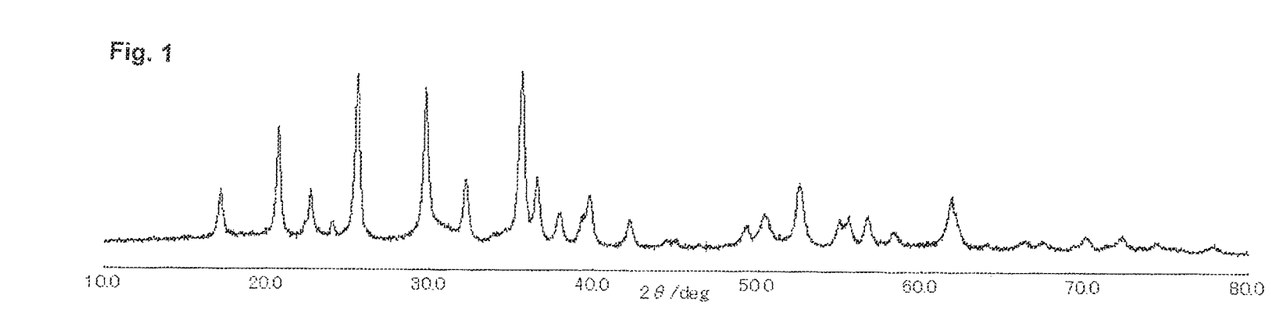
FIG. 1 is a X-ray diffraction pattern of the cathode active material A1 of Example 1 in accordance with the present invention.
Figure 2:
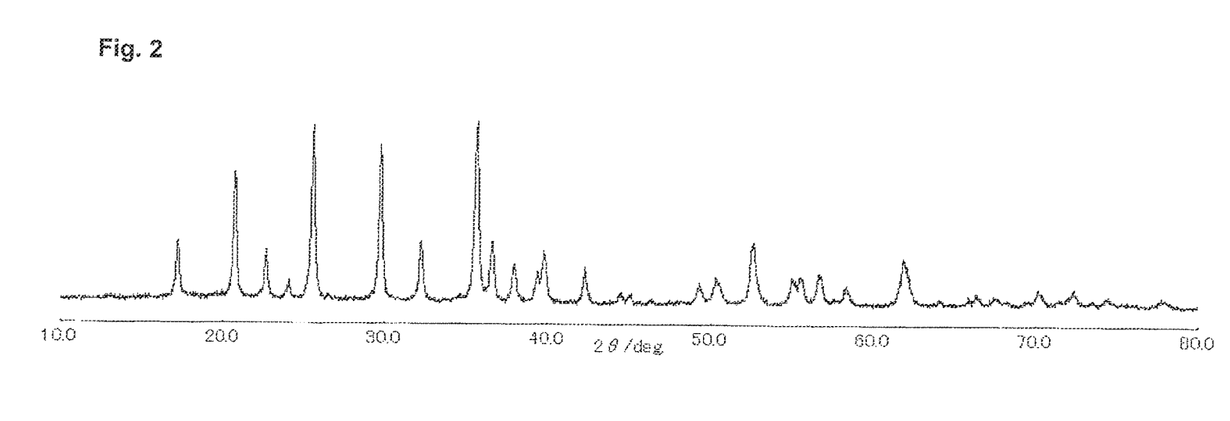
FIG. 2 is a X-ray diffraction pattern of the cathode active material of Comparative Example 3.

The cathode active material was crushed with use of a mortar to form a fine powder. The obtained fine powder was subjected to X-ray measurement by an X-ray analysis apparatus (product name: MiniFlexIII, manufactured by Rigaku Co., Ltd.) from 10° to 80° using a Cu tube ball at room temperature, thereby to obtain a powder X-ray diffraction pattern. The obtained powder X-ray diffraction pattern was subjected to Rietveld analysis to obtain lattice constants. Among the obtained diffraction patterns, the X-ray diffraction patterns of A1 and B3 are shown in FIGS. 1 and 2, respectively, as representative figures. Also, the lattice constants of each sample obtained by structural analysis of the powder X-ray diffraction pattern are shown in Table 1.

TABLE 1

| cathode active material | composition | a (Å) | b (Å) | c (Å) | V (Å$^3$) | total amount of M1, M2 and M3 in Li site |
|---|---|---|---|---|---|---|
| A1 | LiFe0.95Zr0.025Al0.025P0.925Si0.075O4 | 10.334 | 6.006 | 4.699 | 291.646 | 2.7% |
| A2 | LiFe0.9Zr0.05Al0.05P0.85Si0.15O4 | 10.326 | 6.002 | 4.702 | 291.433 | 3.5% |
| A3 | LiFe0.9Zr0.025Al0.075P0.875Si0.125O4 | 10.334 | 6.006 | 4.699 | 291.612 | 3.7% |
| A4 | LiFe0.875Zr0.0625Al0.0625P0.8125Si0.1875O4 | 10.331 | 6.005 | 4.699 | 291.535 | 3.1% |
| A5 | LiFe0.875Zr0.025Al0.1P0.85Si0.15O4 | 10.324 | 6.000 | 4.694 | 290.761 | 3.2% |
| B1 | LiFe0.95Al0.05P0.95Si0.05O4 | 10.331 | 6.006 | 4.697 | 291.432 | 4.1% |
| B2 | LiFe0.875Al0.125P0.875Si0.125O4 | 10.326 | 6.004 | 4.694 | 291.018 | 0.8% |
| B3 | LiFe0.9Zr0.1P0.8Si0.2O4 | 10.335 | 6.004 | 4.707 | 292.108 | 2.7% |
| B4 | LiFePO4 | 10.330 | 6.010 | 4.690 | 291.171 | 0% |

<Electrode Characteristics Evaluation>

(1) Fabrication of Cathode Electrode

Next, a cathode electrode for electrode characteristics evaluation was fabricated by the following procedure.

About 1 g of the cathode active material was weighed and crushed with use of an agate mortar. To this, about 10 wt % (relative to the cathode active material) of acetylene black (trade name: "DenkaBlack", manufactured by Denki Kagaku Kogyo Kabushiki Kaisha) as an electroconductive material and about 10 wt % (relative to the cathode active material) of a polyvinylidene fluoride resin powder as a binder were mixed.

This mixture was dissolved in a solvent such as N-methyl-2-pyrrolidone to form a slurry, and this slurry was applied onto both surfaces of an aluminum foil having a thickness of 20 μm by the doctor blade method. The application amount was set to be about 5 mg/cm$^2$. After this coating film was dried, the resultant was pressed to fabricate a cathode electrode. Here, the size of the cathode electrode was set to be 2 cm×2 cm.

(2) Method for Fabrication of Beaker Cell

With use of the electrode obtained by the above fabrication method, a beaker cell was fabricated by the following procedure. With use of the fabricated beaker cell, initial characteristics and volume change ratio of each sample were measured.

The above dried cathode electrode was put into 50 ml of an electrolytic solution which had been put into a glass container of 100 ml, together with Li metal as a counter electrode, thereby to obtain a beaker cell. As the electrolytic solution (manufactured by Kishida Chemical Co., Ltd.), one in which $LiPF_6$ had been dissolved so as to attain a concentration of 1.4 mol/l in a solvent obtained by mixing ethylene carbonate and diethyl carbonate so that a volume ratio would be 5:5 was used.

The beaker cell fabricated in this manner was subjected to initial charging in an environment of 25° C. The charging current was set to be 0.1 C, and the charging was ended at a time point at which the electric potential of the battery reached 4 V. After the charging was ended, discharging was carried out at 0.1 C, and the discharging was ended at a time point at which the electric potential of the battery reached 2.0 V. The actual measured capacity of the battery at the time of ending was determined. Also, charging/discharging was carried out at 25° C. at 2 C, and the ratio of the charging/discharging capacity relative to the case of 0.1 C was determined. Results of these are shown in Table 2.

(3) Measurement of Volume Change Ratio

With use of the cathode electrode of the beaker cell after the above initial characteristics measurement, lattice constants in the cathode active material after deintercalation of Li were determined. As the cathode active material after deintercalation of Li, a cathode active material having the same composition as that in a state of deintercalation of Li on which the charging capacity had been confirmed was used, and the X-ray measurement was carried out at room temperature. Specifically, in the above beaker cell, the cathode electrode was taken out in a fully charged state, and an XRD measurement of the electrode after the above deintercalation of Li was carried out to perform structural analysis of the cathode active material.

The volume change ratio (%) by charging/discharging was calculated by determining each volume from the lattice constants of the structure at the charging time and the lattice constants of the structure at the discharging time and using the following formula.

$$\text{Volume change ratio}(\%) = (1 - \text{volume of the structure at the charging time}/\text{volume of the structure at the discharging time}) \times 100$$

Here, the structure at the time of charging is assumed to be a structure at the time of deintercalation of Li, and the structure at the time of discharging is assumed to be a structure at the time of intercalation of Li. Also, the volume change ratio obtained here is shown in Table 2.

(4) Measurement of Capacity Retaining Ratio

The cathode electrode fabricated by the above-described method of fabricating a cathode electrode and a anode electrode fabricated by the following procedure were combined to fabricate a laminate cell, and a capacity retaining ratio was measured.

As a anode active material, natural graphite powder was used. To this anode active material, about 10 wt % of a polyvinylidene fluoride resin powder was mixed as a binder. This mixture was dissolved in N-methyl-2-pyrrolidone to form a slurry. The obtained slurry was applied onto both surfaces of a copper foil having a thickness of 20 μm. After drying, the resultant was pressed to fabricate the anode electrode.

The cathode electrode was cut out to a size of 25 mm×25 mm, and the anode electrode was cut out to a size of 30 mm×30 mm. As electric current introduction terminals of the battery, a tab made of aluminum and having a width of 5 mm×length of 50 mm was welded to the cathode electrode, and a tab made of Ni and having a width of 5 mm×length of 50 mm was welded to the anode electrode.

A laminate body was obtained in which a separator made of porous polyethylene was interposed between the cathode electrode and the anode electrode provided with the tabs. The laminate body was interposed between laminate films obtained by bonding a thermoplastic resin onto two sheets of metal foils, and the peripheries were tightly closed by thermal fusion, thereby to form an outer cladding of the battery. Here, in this laminate, an opening for electrolyte injection was provided.

Through the opening, an electrolyte made of 50 vol % of ethylene carbonate and 50 vol % of diethyl carbonate in which $LiPF_6$ had been dissolved at a concentration of 1 mol/L was injected.

After the electrolyte was injected into the inside of the battery, the opening of the battery container was sealed to complete fabrication of the secondary battery.

Figure 3:
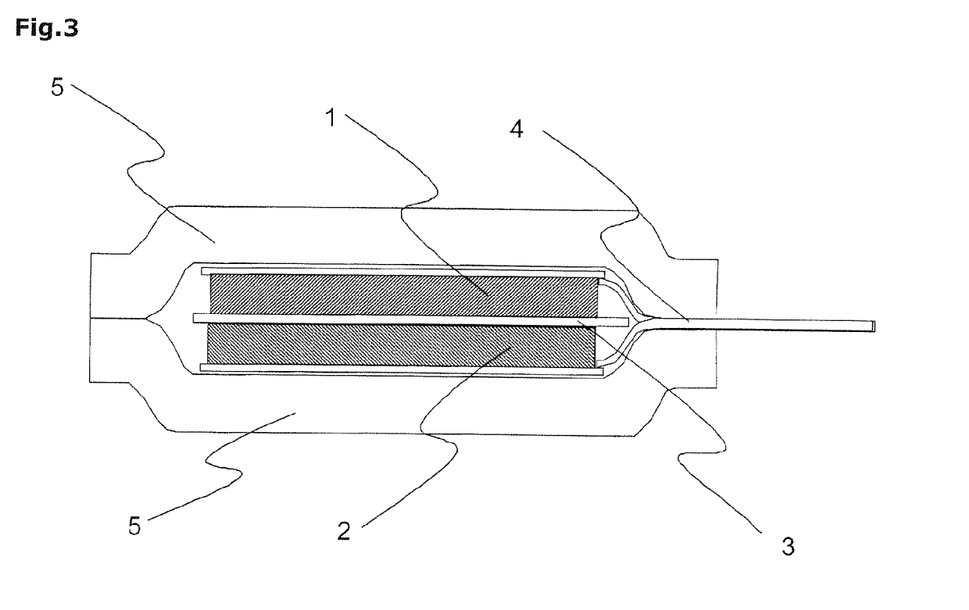
FIG. 3 is a schematic cross-sectional view of the battery fabricated in Example of the present invention.

FIG. 3 shows a schematic cross-sectional view of the battery fabricated in the above-described manner. Here, in FIG. 3, 1 represents the cathode electrode; 2 represents the anode electrode; 3 represents the separator; 4 represents the cathode electrode and anode electrode tabs; and 5 represents the laminate.

The battery fabricated in this manner was subjected to initial charging in an environment of 25° C. The charging current was set to be 0.1 C, and the charging was ended at a time point at which the electric potential of the battery reached 4 V. After the charging was ended, discharging was carried out at 0.1 C, and the discharging was ended at a time point at which the electric potential of the battery reached 2.0 V, so as to determine an initial capacity of this battery. Further, charging/discharging was repeated at an electric current of 1 C, and the discharging capacity at the 1000th time was measured to determine the capacity retaining ratio by the following formula.

$$\text{Capacity retaining ratio} = (\text{discharging capacity at the 1000th time})/(\text{initial discharging capacity})$$

TABLE 2

| cathode active material | initial discharging capacity (mAh/g) | 2 C/0.1 C | volume change ratio (%) | capacity retaining ratio at 1000th time |
|---|---|---|---|---|
| A1 | 111.2 | 91% | 5.8% | 82% |
| A2 | 124.0 | 92% | 5.1% | 88% |
| A3 | 114.2 | 91% | 5.2% | 87% |
| A4 | 124.6 | 95% | 4.3% | 93% |
| A5 | 119.4 | 92% | 5.4% | 84% |
| B1 | 107.0 | 85% | 6.4% | 77% |
| B2 | 109.5 | 83% | 6.1% | 79% |
| B3 | 93.4 | 78% | 2.9% | 94% |
| B4 | 150.3 | 91% | 6.5% | 76% |

From Table 2, it will be understood that the cathode active materials of Examples have a high initial discharging capacity with a restrained lowering ratio of the discharging capacity at the 1000th time relative to the initial discharging capacity.

According to the present invention, the volume change occurring at the time of intercalation and deintercalation of Li can be restrained, and also the diffusibility and the electron conductivity of Li ions can be improved. As a result thereof, when a battery is fabricated by using the cathode active material, the expansion and contraction of the cathode electrode due to charging/discharging can be restrained, and also excellent charge/discharge characteristics can be obtained. Therefore, a cathode active material and a cathode electrode capable of producing a battery that is excellent not only in safety and cost performance but also in long lifetime and charge/discharge characteristics can be provided.

What is claimed is:

1. A cathode active material comprising a composition represented by the following general formula (I):

$$Li_aM1_xM2_yM3_zP_mSi_nO_4 \qquad (1)$$

wherein M1 is at least one kind of element selected from the group of Mn, Fe, Co and Ni; M2 is any one kind of element selected from the group of Zr, Sn, and Y; M3 is Al; "a" satisfies 0<a≤1; "x" satisfies 0<a≤2; "y" satisfies 0<y<1; "z" satisfies 0<z<1; "m" satisfies 0<m<10; and "n" satisfies 0<n≤1.

2. The cathode active material according to claim 1, wherein M1 is Fe, Mn or mixture thereof.

3. The cathode active material according to claim 1, wherein M2 is Zr.

4. The cathode active material according to claim 1, wherein "y" and "z" satisfy the formula x+y+z≥1.

5. The cathode active material according to claim 1, wherein "m" and "n" satisfy the formula 0<m+n≤1.5.

6. The cathode active material according to claim 1, wherein "a", "x", "y", "z", "m" and "n" satisfy the formula a+x+y+z+m+n=3.

7. The cathode active material according to claim 1, wherein the cathode active material has a composition represented by the following general formula:

$$Li_aFe_xZr_yAl_zP_mSi_nO_4$$

wherein "a" satisfies 0<a≤1; "x" satisfies 0<x≤2; "y" satisfies 0<y<1; "z" satisfies 0<z<1; "m" satisfies 0<m<10; and "n" satisfies 0<n≤1.

8. A cathode electrode comprising the cathode active material of claim 1, an electroconductive material, and a binder.

9. A non-aqueous secondary battery comprising the cathode electrode of claim 8, a anode electrode, an electrolyte and a separator.

* * * * *